United States Patent
Volkman et al.

(10) Patent No.: US 10,103,962 B1
(45) Date of Patent: *Oct. 16, 2018

(54) RETURN PATH TRACE

(71) Applicant: Amazon Technologies, Inc., Seattle, WA (US)

(72) Inventors: Jeremy R. Volkman, Seattle, WA (US); Richard H. Galliher, III, Seattle, WA (US); Thomas Bradley Scholl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,162

(22) Filed: Apr. 20, 2016

Related U.S. Application Data (63) Continuation of application No. 13/655,274, filed on Oct. 18, 2012, now Pat. No. 9,344,320.

(51) Int. Cl.
| | | |
|---|---|---|
| *G06F 15/173* | (2006.01) | |
| *H04L 12/28* | (2006.01) | |
| *H04L 12/26* | (2006.01) | |
| *H04L 29/06* | (2006.01) | |
| *H04L 29/12* | (2006.01) | |

(52) U.S. Cl.
CPC ......... *H04L 43/12* (2013.01); *H04L 61/1511* (2013.01); *H04L 69/28* (2013.01)

(58) Field of Classification Search
CPC ... H04L 29/08072; H04L 29/06; H04L 43/00; H04L 12/2602; H04L 41/22; H04L 45/00; H04L 29/06027; H04L 12/66; H04L 47/10; H04L 63/0263; H04L 63/0227; H04L 63/02; H04L 63/029; H04L 63/0209
USPC ......................................................... 709/224
See application file for complete search history.

(56) References Cited

U.S. PATENT DOCUMENTS

| | | | | |
|---|---|---|---|---|
| 7,480,305 | B1 * | 1/2009 | Somasundaram | ........................... H04L 29/12377 370/392 |
| 2006/0002292 | A1 * | 1/2006 | Chang | ................... H04L 12/462 370/225 |
| 2007/0025241 | A1 * | 2/2007 | Nadeau | ............... H04L 12/4633 370/229 |
| 2008/0205292 | A1 * | 8/2008 | Denby | ................ H04L 43/0829 370/254 |
| 2009/0135728 | A1 * | 5/2009 | Shen | ....................... H04L 43/12 370/250 |
| 2009/0248934 | A1 * | 10/2009 | Ge | ......................... G06F 9/4812 710/261 |
| 2011/0013521 | A1 * | 1/2011 | Sankaran | ............ H04L 41/0677 370/242 |

(Continued)

*Primary Examiner* — Mahran Abu Roumi
(74) *Attorney, Agent, or Firm* — Baker & Hostetler LLP (57) ABSTRACT

A reverse network tracing mechanism is described. In an embodiment, a network information request is received that is addressed to a predetermined destination. It is determined that the network information request has an expired timer and a message is returned indicating that a return network path routing procedure has been initiated. After determining that the network information request has an unexpired timer, contents of the network information request are modified to enable identification of at least a portion of the return path from the predetermined destination to a source address of the network information request.

20 Claims, 9 Drawing Sheets

(56) References Cited

U.S. PATENT DOCUMENTS

| | | | |
|---|---|---|---|
| 2012/0054338 A1* | 3/2012 | Ando | H04L 41/0806 709/224 |
| 2012/0079055 A1* | 3/2012 | Robinson | H04L 61/1511 709/213 |
| 2012/0096166 A1* | 4/2012 | Devarapalli | H04L 61/1511 709/226 |
| 2013/0148547 A1* | 6/2013 | Page | H04L 67/12 370/255 |
| 2013/0152187 A1* | 6/2013 | Strebe | H04L 63/101 726/11 |
| 2013/0259050 A1* | 10/2013 | Eastlake | H04L 45/74 370/392 |
| 2014/0043992 A1* | 2/2014 | Le Pallec | H04L 43/10 370/252 |

* cited by examiner

RETURN PATH TRACE

CROSS-REFERENCE TO RELATED APPLICATIONS

This application is a continuation of U.S. patent application Ser. No. 13/655,274, filed Oct. 18, 2012, the disclosure of which is incorporated herein by reference.

BACKGROUND

Network diagnostic tools are useful for identifying issues and problems in a computer network such as a slow network connection. For example, the "traceroute" utility and similar diagnostic tools are useful for identifying the hops/paths, or transfers through nodes on a network, that a message traverses from a source network address to a destination network address. The traceroute utility may provide a user with the routers traversed from the source network address to the destination network address, as well as the elapsed time for each hop. This information can be useful for identifying a failed connection or for identifying the cause of a slow connection.

DETAILED DISCLOSURE

In general, this disclosure describes a system and method for implementing a reverse network path tracing mechanism. In one embodiment, a reverse traceroute proxy (RTP) mechanism is implemented within a destination network. The RTP receives traceroute messages bound for the destination network address and "loops" the traceroute messages back to the source. The computer at the source address executing the traceroute utility will receive both the forward and return path information and thus be able to determine the hops to the destination network address and subsequent hops identifying the path taken back to the source of the traceroute message.

Figure 1:
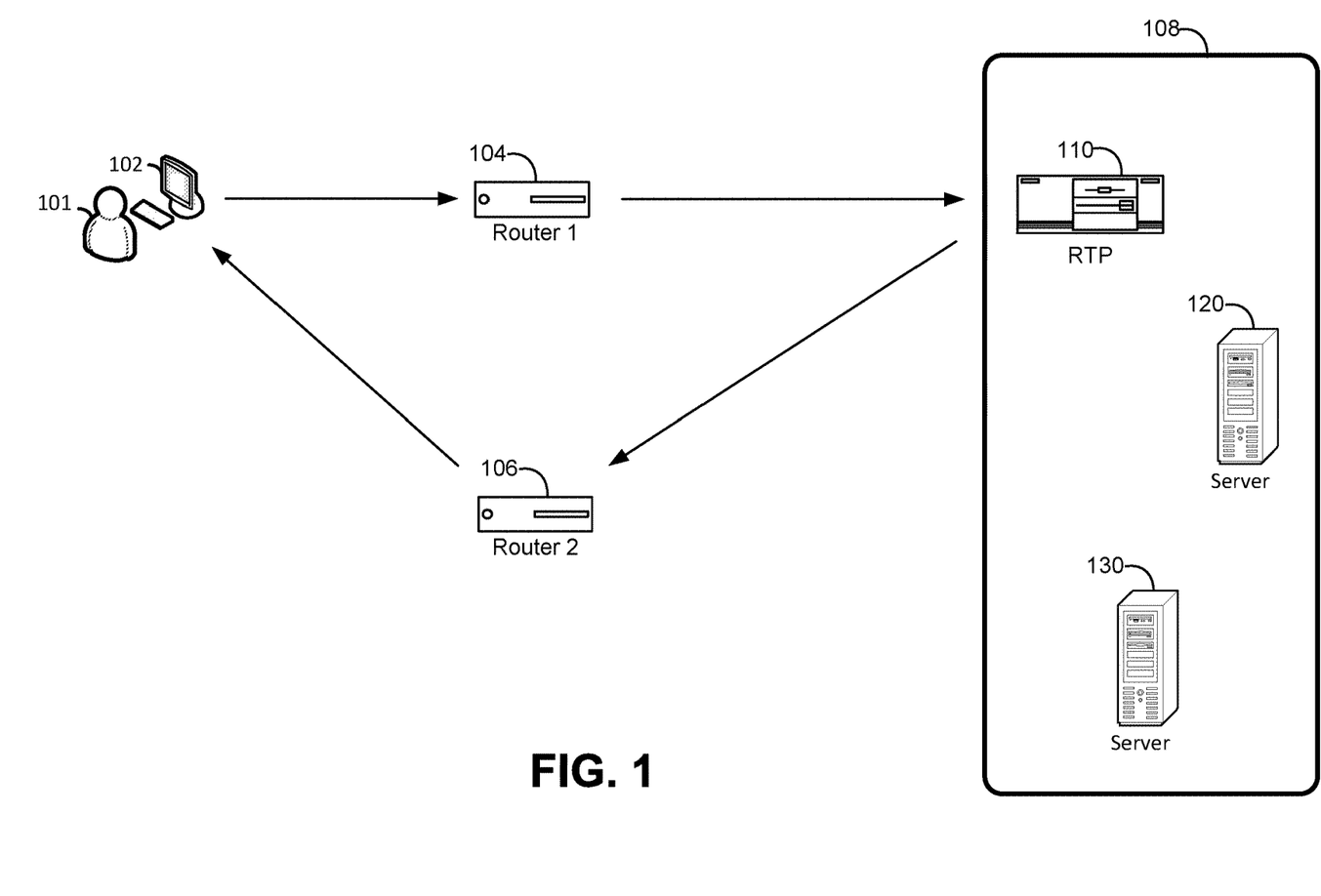
FIG. 1 is a diagram illustrating a reverse traceroute proxy mechanism in accordance with the present disclosure.

FIG. 1 illustrates one example embodiment of an RTP mechanism in accordance with the present disclosure. FIG. 1 illustrates servers 120 and 130 in a data center 108 that are configured to provide computing resources to users such as computer user 101 operating a computing device 102. Computer user 101 may desire to collect information regarding the data path from computing device 102 to data center 108. Data packets from computing device 102 may take a forward path via router 1 (104). However, returned messages from data center 108 may take a reverse path via router 2 (106). In an embodiment, data center 108 may provide one or more RTP mechanisms 110 implemented on one or more computing resources in data center 108. When user 101 initiates a traceroute utility from computing device 102 indicating data center 108 as the destination, the traceroute utility may send a traceroute message to data center 108. RTP 110 may be configured to receive messages addressed to data center 108 and send response messages so that computing device 102 receives traceroute information not only for the forward path via router 1 (104), but also the reverse path via router 2 (106).

In general, the traceroute utility is one example of a network diagnostic function that can be used to identify the network path that a data packet takes from a source computer to a destination computer. The traceroute utility typically lists the intermediate routers that the data packet passes through until either the packet reaches its destination or fails to reach its destination and is discarded. In addition, the traceroute utility typically collects information for the elapsed time taken for each hop from router to router. A user may thus be able to identify how the source and destination systems are connected to each other and the latencies involved for each hop. For example, referring to FIG. 2, a user 200 operating a computer 202 may wish to determine the network path from computer 202 to a host server 208. A traceroute utility may be used to determine that messages from computer 202 take a first hop to intermediate router 1 (204). Although messages from host server 208 to computer 202 may take an alternate path for example, through router 2 (206), traceroute utilities typically do not provide for tracing of such reverse paths.

In one embodiment that may be implemented in Internet Protocol (IP) networks, the traceroute utility operates by causing each router along a network path to return an ICMP (Internet Control Message Protocol) message. An IP packet typically contains a time-to-live (TTL) value which specifies how many hops that the packet can traverse before it expires. Each time a packet passes through a router, its TTL value is decremented by one, and if the TTL value reaches zero, the packet is discarded and a TTL Exceeded message is returned to the source.

The traceroute utility operates by initially sending a packet with a TTL value of one. The first router along the path decrements the TTL to zero and discards the packet because the TTL has expired, and returns a TTL Exceeded message. The traceroute utility identifies this router as the first router on the path to the destination. The traceroute utility will then send a packet with a TTL value of two. The first router along the path decrements the TTL to one and forwards the packet to the next router in the path. The second router along the path decrements the TTL to zero and discards the packet because the TTL has expired, and returns a TTL Exceeded error message. The traceroute utility identifies this router as the second router on the path. The traceroute utility sends additional packets with a TTL of three, and then four, and so on, causing each router along the path to return a TTL Exceeded message and thus discovering the intermediate routers in the path until either the final destination is reached or the maximum TTL value is reached and the traceroute ends. The timestamp values returned for each router's TTL Exceeded message may be used to determine the latency values.

Utilities such as traceroute typically operate over Internet Protocol (IP) networks using IP datagrams. For example, in some embodiments the traceroute utility may send a UDP datagram to a random port number that is unlikely to be active. In other embodiments, the traceroute utility may send an ICMP Echo Request packet.

Figure 2:
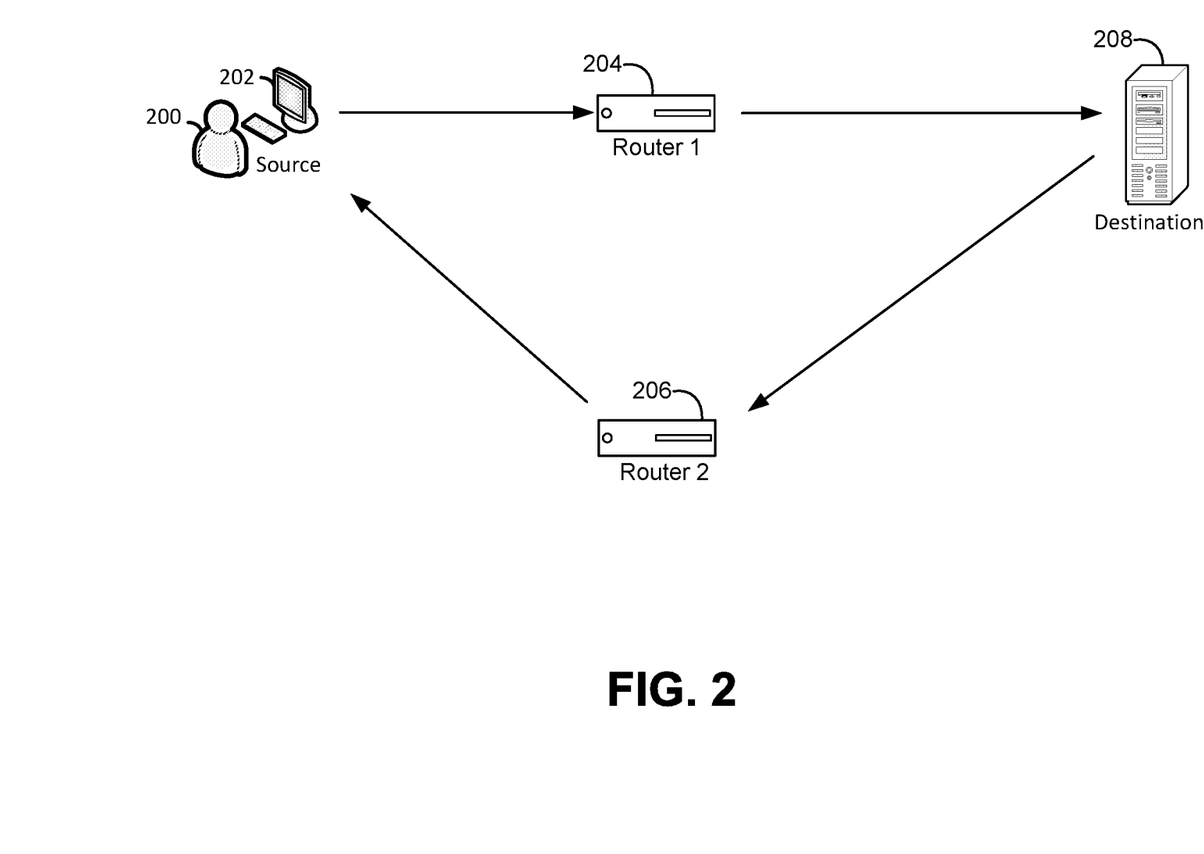
FIG. 2 is a diagram illustrating a traceroute mechanism.

Referring back to FIG. 2, a traceroute utility may be initiated at computer 202 by user 200. User 200 may, for example, execute a traceroute function and enter an IP address or other network name for destination host server 208. For example, a traceroute for destination address a.b.c.d may provide the following results:

| traceroute to a.b.c.d, 64 hops max, 40 byte packets | | |
|---|---|---|
| 1 | 10.s.s.s | 0.579 ms |
| 2 | 10.x.x.x | 0.231 ms |
| 3 | 10.y.y.y | 0.490 ms |
| 4 | a.b.c.d | 0.490 ms |

The above example shows that computer 202 ran a traceroute to a.b.c.d. On the first hop, a packet was sent from computer 202 to the 10.s.s.s network. On the second hop, the packet went to the 10.x.x.x network. On the third hop, the packet went to the 10.y.y.y network. On the fourth hop, the packet reached the a.b.c.d. network (destination host server 208).

Traceroute utilities typically only provide information regarding the forward path to the destination address. However, network traffic involves both a forward route and a return route—the forward route from the source to the destination, and often a return route from the destination back to the source that is different than the forward route. The forward and return routes may therefore be asymmetric. Referring back to FIG. 2, the forward path from source computer 202 to destination computer 208 may traverse router 1 (204). However, the return path from destination host server 208 to source computer 202 may traverse router 2 (206). The routes are different and thus network issues can occur either on the route to the destination or on the route back from the destination. A user may therefore run traceroutes to a destination address and make incorrect or unfounded inferences. For example, if the forward and return paths are completely different, a user may make the assumption that there is a problem with the forward path or the destination network when the issue could be with the return path.

One way to address this issue is to execute a traceroute from the destination network to the user network. However, this would require someone to perform actions at the destination network in conjunction with the user at the original source network. While the destination network may attempt to provide such a reverse traceroute service, users typically do not disclose their identification information to enable such a reverse traceroute service. Additionally, it may not be possible to identify the source network because the source network address is being translated (e.g., NAT'd) at the source. Another issue with the traceroute information not providing the return path is that the round trip latency data may not be accurate since the actual return path may be totally different than the forward path.

In various embodiments described herein, a reverse traceroute proxy (RTP) mechanism is described. In one embodiment, the RTP mechanism can be implemented as a host/service that executes within multiple data center points of presence (POPs). Such an RTP mechanism may be configured to receive traceroute packets bound for the data center's network address and loop the traceroute packets back to the source such that the return hop information is included. In this way, external parties executing traceroutes to the data center will be provided with the hops to the data center and subsequent hops on the return path to the originator of the traceroute packets.

Various aspects of the disclosure will now be described with regard to certain examples and embodiments, which are intended to illustrate but not to limit the disclosure. In the following detailed description, references are made to the accompanying drawings that form a part hereof, and that show, by way of illustration, specific embodiments or examples. The drawings herein are not drawn to scale. Like numerals represent like elements throughout the several figures.

Figure 3:
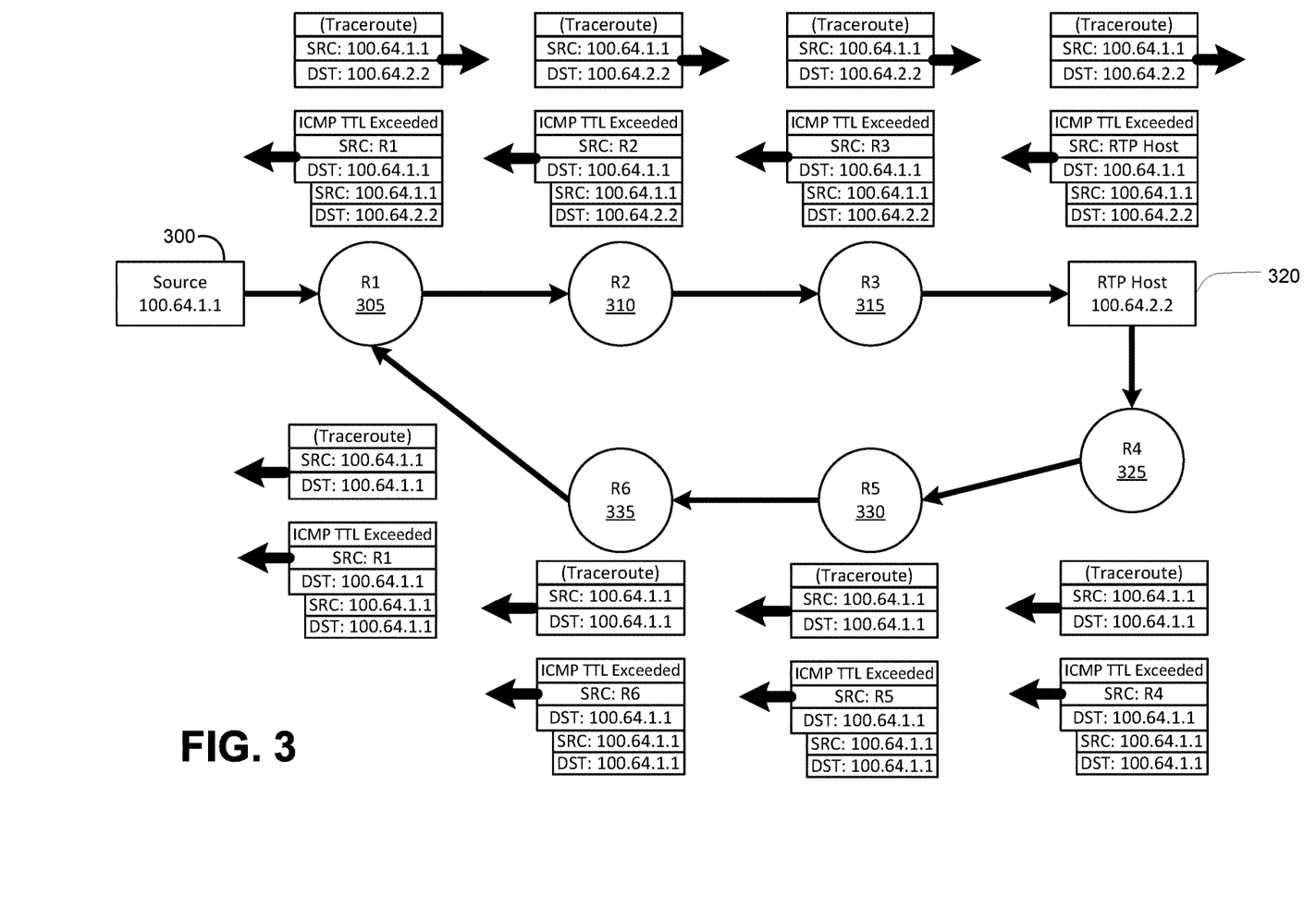
FIG. 3 is a diagram illustrating a reverse traceroute proxy mechanism in accordance with the present disclosure.

In one embodiment illustrated in FIG. 3, an RTP host 320 may be configured to provide a reverse traceroute proxy mechanism. RTP host 320 may be implemented on a computing device such as a server or other resource within a data center providing computing services for a host network. RTP host 320 may examine incoming data for any packets bound for its IP address (100.64.2.2 in this example) as the destination. Such packets may be ICMP datagrams, UDP datagrams, TCP packets, or other data units that may be considered valid types of packets to proxy by the RTP. In one embodiment, RTP host 320 may be configured to examine data traffic for any packets that have a TTL=1. In order to inform a source 300 (which in this example has IP address 100.64.1.1) that initiated a traceroute that the reverse portion of the traceroute is starting, RTP host 320 may respond to such a packet with an ICMP TTL Exceeded (or similar) message sourced from an IP network address that indicates that the reverse traceroute to the source has begun. In one embodiment, for any packet received at RTP host 320 from source 300 with a TTL=1, RTP host 320 may generate an ICMP TTL Exceeded message destined to source 300 with a source IP address that resolves to a descriptive DNS name indicative of the start of the reverse traceroute. For example, the DNS can be "reverse-traceroute-begins.host.com." Other addresses may be used that may uniquely identify to the traceroute originator that the reverse traceroute process has begun.

For packets received at RTP host 320 with a TTL of 2 or more, RTP host 320 may change the destination IP address to the source IP address (e.g., change the destination IP address from 100.64.2.2 to 100.64.1.1). RTP host 320 may then forward the packet back out to the Internet after decrementing the TTL. For example, when the received packet has a TTL of 2, then RTP host 320 may forward the packet back out to the Internet with TTL=1. The router at the next hop, which in this example is router R4 (325), will receive the packet, decrement the TTL to zero, and send an ICMP TTL Exceeded message back to source 300. The ICMP TTL Exceeded message will be routed back to source 300 via the return path through routers 325, 330, 335, and 305, and source 300 will be able to determine the first router R4 (325) on the return path from RTP host 320 to source 300.

When the received packet has a TTL of 3, then RTP host 320 may forward the packet back out to the Internet with TTL=2. Router R4 (325) will receive the packet, decrement the TTL to 1, and forward the packet back out to the Internet with TTL=2. The router at the next hop, which in this example is router R5 (330), will receive the packet, decrement the TTL to zero, and send an ICMP TTL Exceeded message back to source 300. By continuing in this fashion, a series of ICMP TTL Exceeded messages will be returned to source 300 by each router in the return path and source 300 will be able to determine the return path through routers R4 (325), R5 (330), R6 (335), and R1 (305).

Figure 4:
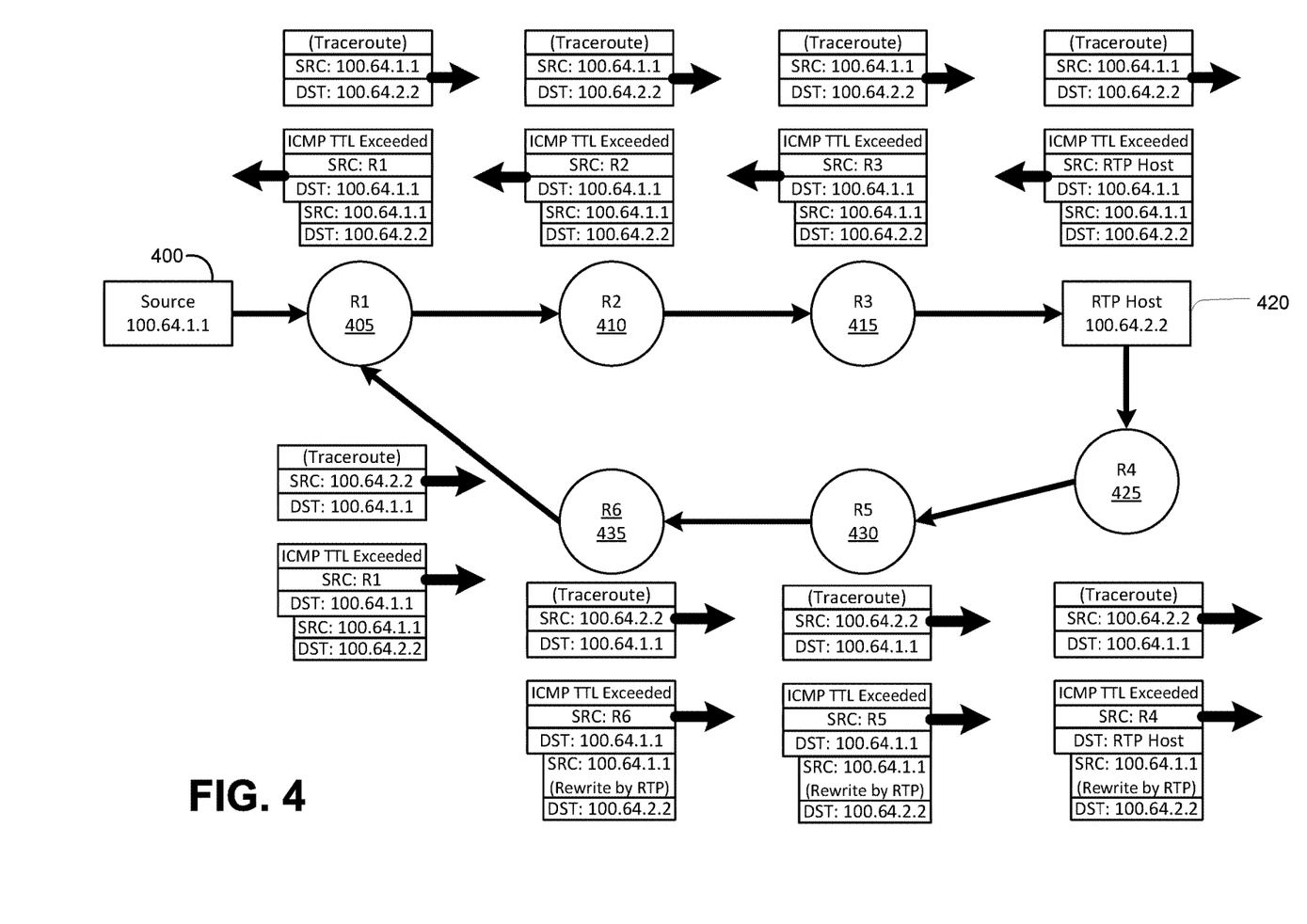
FIG. 4 is a diagram illustrating a reverse traceroute proxy mechanism in accordance with the present disclosure.

In another embodiment illustrated in FIG. 4, for packets received at RTP host 420 from source 400 with a TTL=1, RTP 420 may generate an ICMP TTL Exceeded message destined to source 400 with a source IP address that resolves to a descriptive DNS name indicating that the reverse traceroute to RTP host 420 has begun (e.g., reverse-traceroute-begins.host.com).

For packets received at RTP host 420 with TTL of 2 or more, RTP host 420 may change the destination IP address to the source IP address (in this example, the destination IP address is changed from 100.64.2.2 to 100.64.1.1). RTP 420 may also change the source IP address to a unique RTP host IP address (i.e., not an IP address that can be tracerouted to the RTP). In this example, the source IP address is changed to 100.64.2.2. The packet is then forwarded out to the Internet from RTP host 420.

In this embodiment, the modified packets are now addressed to source 400 (with IP address 100.64.1.1) as the destination, and any resulting ICMP TTL Expired messages will now be returned to RTP host 420 (with IP address 100.64.2.2) instead of being returned to source 400. When such messages are received by RTP host 420, RTP host 420 may generate an ICMP TTL Exceeded message back to the original source but may first modify the ICMP TTL Expired message payload to contain the original packet and reset the values that were originally transmitted. In some embodiments, the source and destination IP addresses in the payload may be modified to include the information that was transmitted from source 400. RTP host 420 may also spoof the source IP address of all the hops on the return path back towards source 400 to reflect the hops of the return path observed by RTP host 420. By continuing in this manner, return path information for the return path through routers 425, 430, 435, and 405 from RTP host 420 to source 400 will be provided to source 400.

Figure 5:
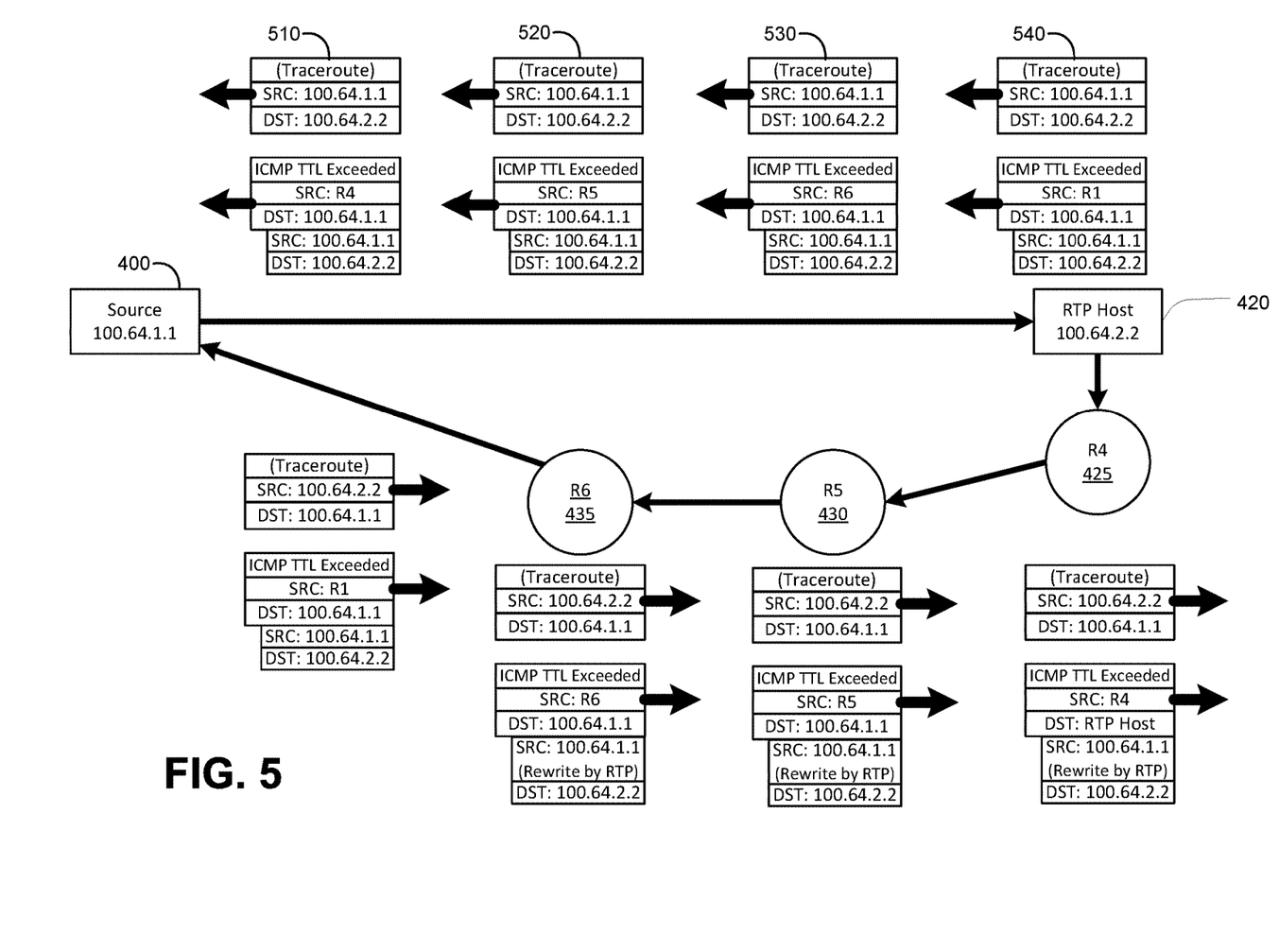
FIG. 5 is a diagram illustrating a reverse traceroute proxy mechanism in accordance with the present disclosure.

FIG. 5 illustrates the TTL Exceeded messages that may be returned to source 400 to indicate the return path. Messages 510, 520, 530, and 540 illustrate the TTL Exceeded messages that correspond to the TTL Exceeded messages received by RTP host 420 from routers R4 (425), R5, (430), R6 (435), and R1 (405). By updating the source and destination address as shown in FIG. 5 so that the TTL Exceeded messages appear to have been generated in response to the original messages from source 400, source 400 can determine the hops on the return path.

The examples illustrated in FIGS. 3 and 4 describe embodiments in the context of a traceroute function operating to route a network path in an IP network with IP datagrams. However, the described principles may be used to provide reverse path information in other contexts or may be used to trace other paths. For example, in addition to identifying a reverse path as discussed above, embodiments described herein may be used to identify other path types or schemes. For example, data flows that may take multiple paths across a plurality of nodes may be traced using a trace proxy mechanism as described above.

Figure 6:
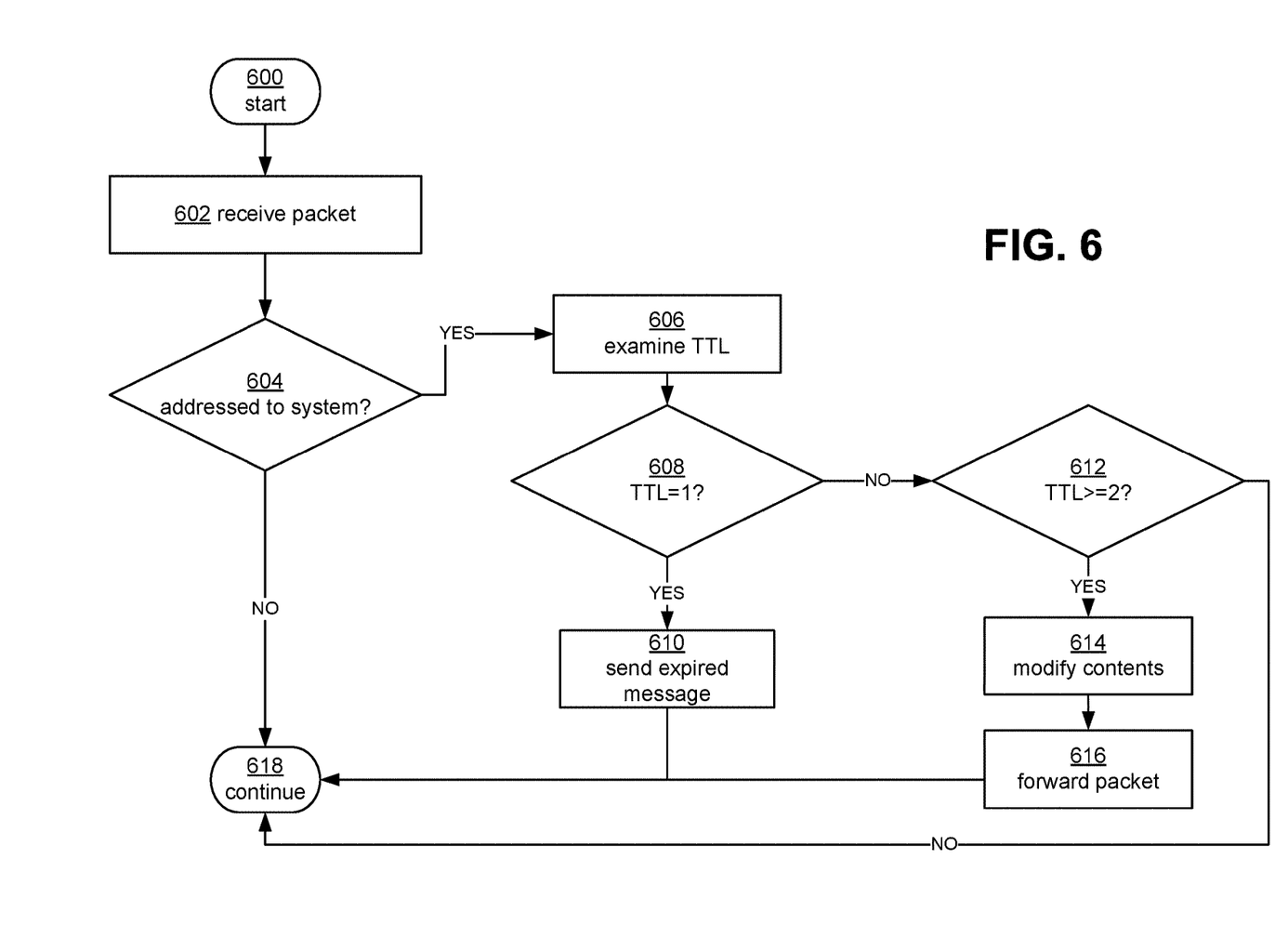
FIG. 6 is a flowchart of one embodiment of a process for providing a reverse traceroute proxy mechanism.

FIG. 6 illustrates an example operational procedure for providing a reverse traceroute proxy (RTP) mechanism. Referring to FIG. 6, operation 600 begins the operational procedure. Operation 600 may be followed by operation 602. Operation 602 illustrates receiving a route tracing request packet. As explained above, such packets may be ICMP datagrams, UDP datagrams, TCP packets, or other data units that may be considered valid types of data units to proxy by the RTP mechanism. Operation 602 may be followed by operation 604. Operation 604 illustrates determining if the route tracing request packet is addressed to a network address that resolves to the computing system's address. If the route tracing request packet is not addressed to a network address that resolves to the computing system's address, then operation 604 may be followed by operation 618.

If the route tracing request packet is addressed to a network address that resolves to the computing system's address, then operation 604 may be followed by operation 606. Operation 606 illustrates examining the route tracing request packet for a time-to-live (TTL)=1. Operation 606 may be followed by operation 608. If the route tracing request packet has a time-to-live (TTL)=1, then operation 608 may be followed by operation 610. Operation 610 illustrates that a TTL Exceeded message is sent. The TTL Exceeded message may be addressed to the source address included in the route tracing request packet. The TTL Exceeded message may also include a modified source address set to an address that resolves to a DNS name indicative of the reverse traceroute process.

If the route tracing request packet has a TTL that is a value other than 1, then operation 608 may be followed by operation 612. If the route tracing request packet has a TTL<2, then operation 612 may be followed by operation 618. If the route tracing request packet has a TTL>=2, then operation 612 may be followed by operation 614. Operation 614 illustrates that the contents of the route tracing request packet may be modified to enable tracing of at least a portion of a return path from the computing system to the first source address.

In one embodiment, modifying the route tracing request packet may include changing a destination address of the route tracing request packet to the first source address and setting the TTL=1. In other embodiments, modifying the route tracing request packet may include changing a destination address of the route tracing request packet to the source address identified in the packet and setting the new source address of the route tracing request packet to an address associated with the computing system implementing the RTP mechanism. The system may further receive a TTL Exceeded message addressed to the address associated with the computing system and generating a TTL Exceeded message addressed to the original source address. The TTL Exceeded message may include previously received source and destination information. Furthermore, the generated TTL Exceeded message may include modified source and destination addresses indicative of return path information.

Operation 614 may be followed by operation 616. Operation 616 illustrates that the route tracing request packet may be forwarded back out to the communication network such as the Internet.

Figure 7:
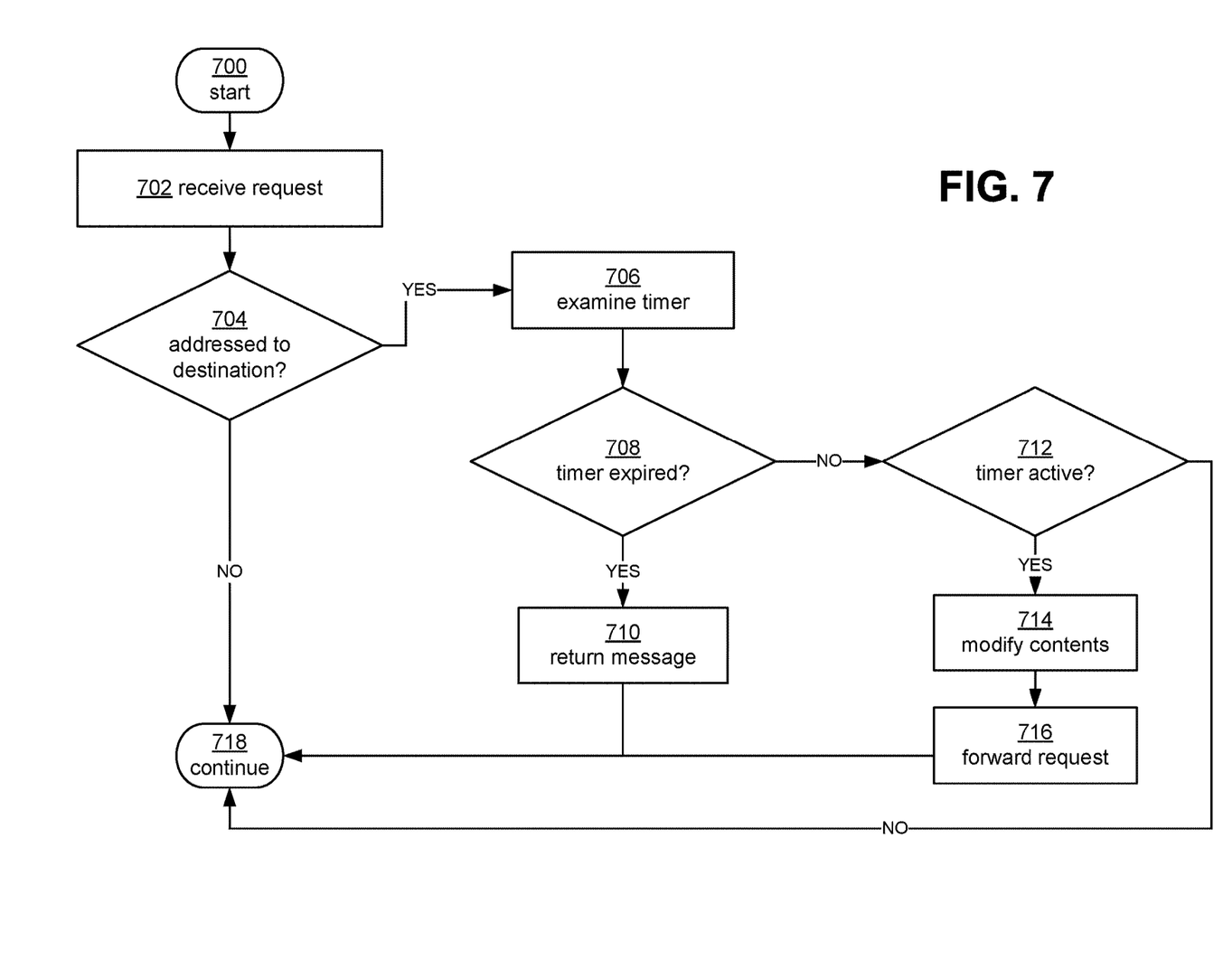
FIG. 7 is a flowchart of one embodiment of a process for providing a reverse traceroute proxy mechanism.

FIG. 7 illustrates an example operational procedure for identifying network information such as a reverse network path as described herein. Referring to FIG. 7, operation 700 begins the operational procedure. Operation 700 may be followed by operation 702. Operation 702 illustrates receiving a network information request. As discussed above, the network information request may be a message sent in accordance with a protocol such as an Internet Control Message Protocol (ICMP) echo request packet. Operation 702 may be followed by operation 704. Operation 704 illustrates determining if the network information request is addressed to a predetermined destination. In one embodiment, the network information request includes a destination address that resolves to a predetermined network address associated with the network providing an RTP mechanism.

If the network information request is not addressed to the predetermined destination, then operation 604 may be followed by operation 718.

If the network information request is addressed to the predetermined destination, then operation 704 may be followed by operation 706. Operation 706 illustrates examining the network information request for an expired timer. In one embodiment, the timer is a time-to-live (TTL) mechanism for determining if a message is expired. Operation 706 may be followed by operation 708. If the timer is expired, then operation 708 may be followed by operation 710. Operation 710 illustrates returning a message indicating that a return path routing procedure has been initiated.

If the network information request has a timer that has not expired, then operation 708 may be followed by operation 712. If the network information request has a timer that is not active, then operation 712 may be followed by operation 718. If the route tracing request packet has a timer that is active, then operation 712 may be followed by operation 714. Operation 714 illustrates modifying contents of the network information request to enable identification of at least a portion of the return path from the predetermined destination to the source address of the network information request.

Operation 714 may be followed by operation 716. Operation 716 illustrates forwarding the network information request back out to the communication network such as the Internet.

In one embodiment, the timer is a time-to-live (TTL) mechanism for determining if a message is expired. In this embodiment, a TTL Exceeded message is returned that is addressed to a source address of the network information request and with a source address of the TTL Exceeded message set to an address that resolves to a predetermined DNS name. Furthermore, determining that the network information request has an unexpired timer comprises determining that the network information request has a TTL>=2. In some embodiments, modifying contents of the network information request comprises changing a destination address of the network information request to the source address of the network information request and setting the TTL=1. Additionally and optionally, additional network information requests may be received. The contents of the additional network information requests may be modified so that destination addresses of the additional network information requests are set to the source address of the network information request and the TTL values may be adjusted.

Figure 8:
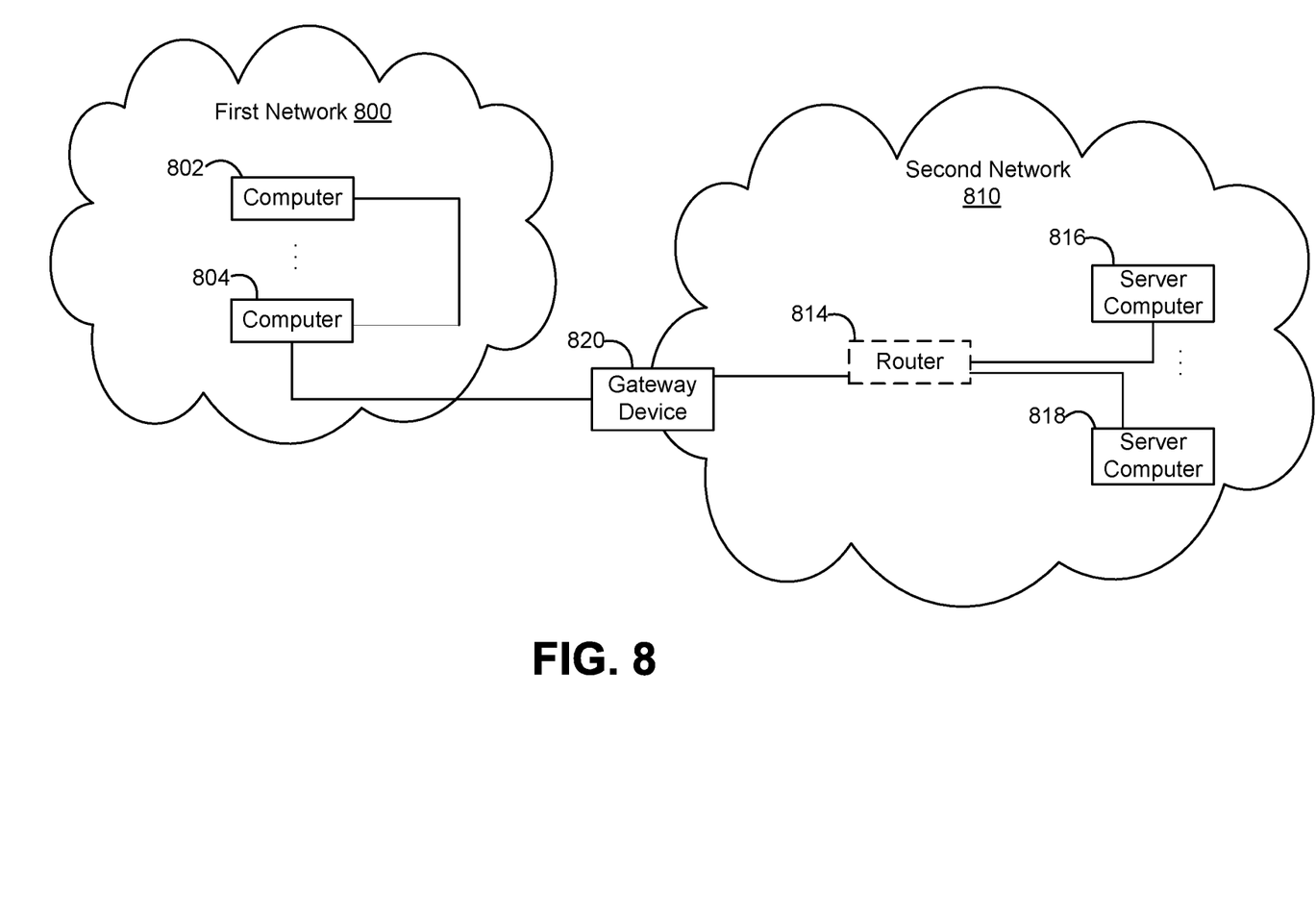
FIG. 8 is a block diagram illustrating an exemplary computer system that may be used in some embodiments.

In other embodiments, modifying contents of the network information request comprises changing a destination address of the network information request to the source address of the network information request and setting a source address of the network information request to an address associated with the computing system that is providing the RTP mechanism. Additionally and optionally, a TTL Exceeded message may be received that is addressed to the address associated with the computing system and a TTL Exceeded message is generated that is addressed to the source address of the network information request that includes previously received source and destination information. The generated TTL Exceeded message may include modified source and destination addresses that indicate return path information FIG. 8 illustrates one example of an environment including a group of computing systems in which aspects of the present disclosure may be implemented. As shown in FIG. 8, the example includes a second network 810 that includes server computers 816 and 818. In particular, second network 810 may be connected to a first network 800 external to second network 810. First network 800 may provide access to computers 802 and 804.

First network 800 may be, for example, a publicly accessible network made up of multiple networks operated by various entities such as the Internet. Second network 810 may be, for example, a company network that is wholly or partially inaccessible from computing systems external to second network 810. Computers 802 and 804 may include, for example, home computing systems that connect directly to the Internet (e.g., via a cable modem or a Digital Subscriber Line (DSL)).

In addition to server computers 816 and 818 of second network 810, second network 810 may include a gateway 820 as discussed above. Second network 810 may further include additional networking devices such as a router 814. Router 814 may manage communications within second network 810, for example by forwarding packets or other data communications as appropriate based on characteristics of such communications (e.g., header information including source and/or destination addresses, protocol identifiers, etc.) and/or the characteristics of the second network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Referring to FIG. 8, server computers 816 and 818 are part of second network 810, and each server computer may be assigned a network address (not shown) in accordance with second network 810. For example, the second network addresses may be unique with respect to the second network but not guaranteed to be unique with respect to other computing systems that are not part of second network 810. As one example, Internet Protocol (IP) and other networking protocols may reserve groups or blocks of network addresses, with such reserved network addresses not being routable over networks external to the second network 810. In such situations, different networks may each use the same network addresses within their networks, as the network addresses are locally unique to each network, but those network addresses may not be used for communications between a computing system of a different network and another computing system external to the network. IP addresses are used to illustrate some example embodiments in the present disclosure. However, it should be understood that other network addressing schemes may be applicable and are not excluded from the scope of the present disclosure.

In this example, to facilitate communications between server computers 816 and 818 of second network 810 and other external computing systems that are not part of second network 810 (e.g., computers 802 and 804 and/or other computing systems that are part of first network 800), one or more gateway devices 820 may be used. In particular, one or more first network 800 addresses (not shown) may have previously been assigned for use in representing second network 810. Such first network addresses may be routable over the Internet such that a communication that is sent by external computer 802 and that has one of second network 810's first network addresses as its destination network address will be routed over the Internet to gateway device 820. Furthermore, additional gateway devices (not shown) may be provided as needed.

Gateway device 820 may operate to manage both incoming communications to the second network 810 from first network 800 and outgoing communications from second network 810 to first network 800. For example, if server computer 816 sends a message (not shown) to one of computers 802 in first network 800, server computer 816 may create an outgoing communication that includes an external first network address (e.g., a public IP address) for computer 802 as the destination address and include a second network address (e.g., a private IP address) for server computer 816 as the source network address. Router 814 then uses the destination address of the outgoing message to direct the message to gateway device 820 for handling. In particular, in order to allow computer 802 to reply to the outgoing message, gateway device 820 may temporarily map one of the public network addresses for second network 810 to server computer 816 and modify the outgoing message to replace the source network address with the mapped first network address. Gateway device 820 may then update its mapping information with the new mapping, and forward the modified outgoing message to the destination computer 802 over the Internet.

If computer 802 responds to the modified outgoing message by sending a response incoming message (not shown) that uses the mapped first network address for server computer 816 as the destination network address, the response incoming message may be directed over the Internet to gateway device 820. Gateway device 820 may then perform similar processing in reverse to that described above for the outgoing message. In particular, gateway device 820 may use its mapping information to translate the mapped first network address into the second network address of server computer 816, modify the destination network address of the response incoming message from the mapped first network address to the second network address of server computer 816, and forward the modified incoming message to server computer 816. In this manner, at least some of the internal computers of second network 810 may communicate with external computing systems via temporary use of the first network addresses. Furthermore, in some situations, one or more of the internal computing systems of second network 810 may be mapped to use one of the first network addresses (e.g., to a unique combination of a first network address and a port number), such that external computing systems may initiate new incoming messages to the internal computing system by directing the new incoming messages to the mapped representative first network address/port as the destination network address of the new incoming messages.

Figure 9:
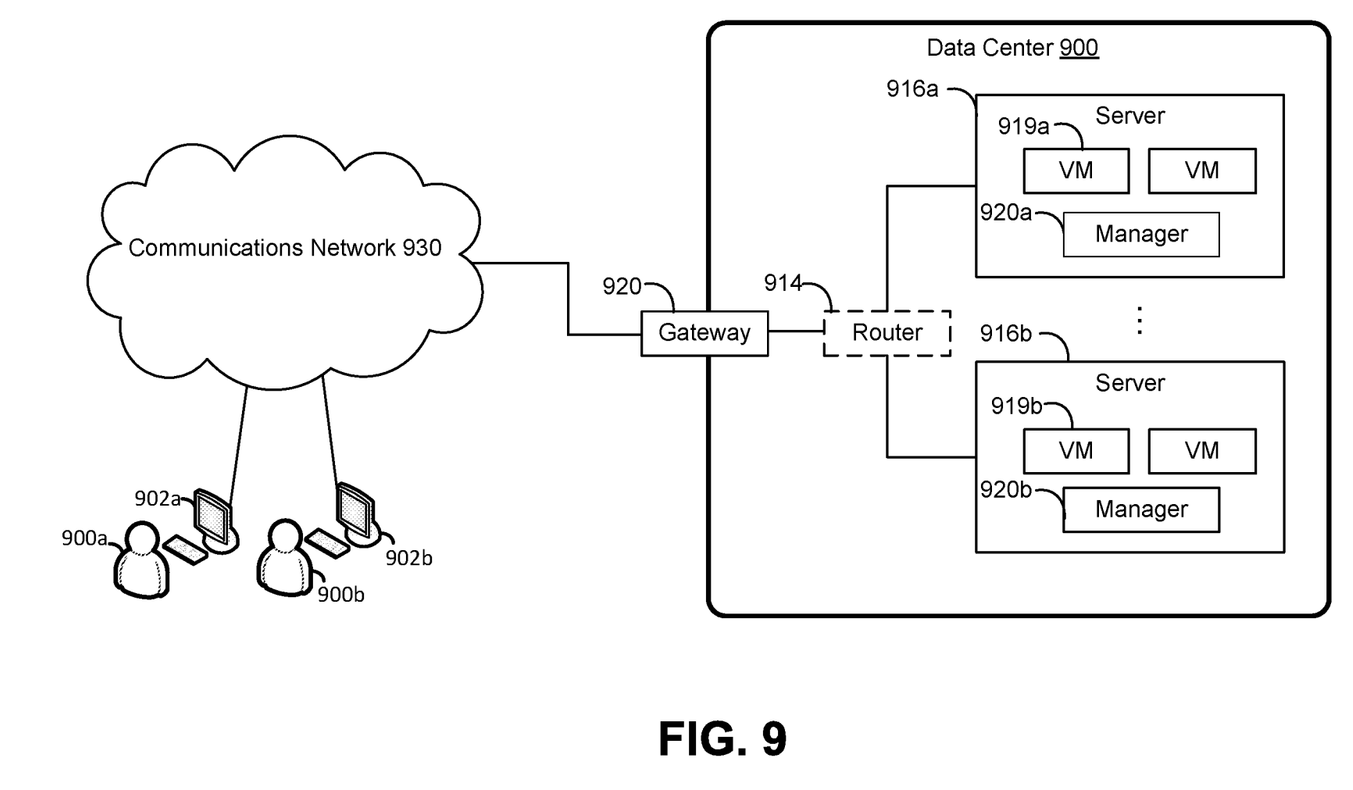
FIG. 9 is a block diagram illustrating an exemplary computer system that may be used in some embodiments.

FIG. 9 depicts an example computing environment wherein aspects of the present disclosure can be implemented. Referring to FIG. 9, communications network 930 may, for example, be a publicly accessible network of linked networks and possibly operated by various distinct parties, such as the Internet. In other embodiments, communications network 930 may be a private network, such as, for example, a corporate or university network that is wholly or partially inaccessible to non-privileged users. In still other embodiments, communications network 930 may include one or more private networks with access to and/or from the Internet.

Communication network 930 may provide access to computers 902. User computers 902 may be computers utilized by customers 900 or other customers of data center 900. For instance, user computer 902*a* or 902*b* may be a server, a desktop or laptop personal computer, a tablet computer, a wireless telephone, a personal digital assistant (PDA), an e-book reader, a game console, a set-top box, or any other computing device capable of accessing data center 900. User computer 902*a* or 902*b* may connect directly to the Internet (e.g., via a cable modem or a Digital Subscriber Line (DSL)). Although only two user computers 902*a* and 902*b* are depicted, it should be appreciated that there may be multiple user computers.

User computers 902 may also be utilized to configure aspects of the computing resources provided by data center 900. In this regard, data center 900 might provide a Web interface through which aspects of its operation may be configured through the use of a Web browser application program executing on user computers 902. Alternatively, a stand-alone application program executing on user computers 902 might access an application programming interface (API) exposed by data center 900 for performing the configuration operations. Other mechanisms for configuring the operation of the data center 900, including deploying updates to an application, might also be utilized.

Servers 916 shown in FIG. 9 may be standard servers configured appropriately for providing the computing resources described above and may provide computing resources for executing one or more applications. In one embodiment, the computing resources may be virtual machine instances 919. In the example of virtual machine instances 919, each of the servers 916 may be configured to execute an instance manager 920*a* or 920*b* capable of executing the virtual machine instances 919. The instance managers 920 may be a virtual machine monitor (VMM) or another type of program configured to enable the execution of virtual machine instances 919 on servers 916, for example. As discussed above, each of the virtual machine instances 919 may be configured to execute all or a portion of an application.

It should be appreciated that this example describes a computing environment providing virtual machine instances, other types of implementations can be utilized with the concepts and technologies disclosed herein. For example, the embodiments disclosed herein might also be utilized with computing systems that do not utilize virtual machine instances.

In the example data center 900 shown in FIG. 9, a router 914 may be utilized to interconnect the servers 916*a* and 916*b*. Router 914 may also be connected to gateway 920 which is connected to communications network 930. Router 914 may manage communications within networks in data center 900, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 919 of data center 900 may form part of one or more networks. In some embodiments, gateway 920 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 919 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 920 may operate to manage both incoming communications to data center 900 from communication network 930 and outgoing communications from data center 900 to communication network 930. For example, if virtual machine instance 919a sends a message (not shown) to computer 902a, virtual machine instance 919a may create an outgoing communication that includes network address on a first network (e.g., an external public IP address) for computer 902a as the destination address and include a network address on a second network (e.g., a private IP address) for virtual machine instance 919a as the source network address. Router 914 may then use the destination address of the outgoing message to direct the message to gateway 920 for handling. In particular, in order to allow computer 902a to reply to the outgoing message, gateway 920 may temporarily map one of the public network addresses for data center 900 to virtual machine instance 919a and modify the outgoing message to replace the private network address for the source network address with the mapped public network address. Gateway 920 may then update its mapping information with the new mapping, and forward the modified outgoing message to computer 902a over the Internet.

If computer 902a responds to the modified outgoing message by sending a response incoming message (not shown) that uses the mapped public network address for virtual machine instance 919a as the destination network address, the response incoming message may be directed over the Internet to gateway 920. Gateway 920 may then perform similar processing in reverse to that described above for the outgoing message. In particular, gateway 920 may use its mapping information to translate the mapped public network address into the private network address of virtual machine instance 919a, modify the destination network address of the response incoming message from the mapped public network address to the private network address of virtual machine instance 919a, and forward the modified incoming message to virtual machine instance 919a. In this manner, at least some of the internal computers of data center 900 may communicate with external computing systems via temporary use of the public network addresses. Furthermore, in some situations, one or more of the internal computing systems of data center 900 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 900 described in FIG. 9 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations. For example, the methods and systems described herein for providing reverse traceroute proxy mechanisms may be performed by devices other than computing systems and gateway devices. For example, the described processes may be performed in part or in whole by other network devices and peripherals such as a network interface card (NIC) or any other device configured to perform such functionality.

In some embodiments, a system memory may be used which is one embodiment of a computer readable storage medium configured to store program instructions and data as described above for FIGS. 1-9 for implementing embodiments of the corresponding methods and apparatus. However, in other embodiments, program instructions and/or data may be received, sent or stored upon different types of computer-accessible media. Generally speaking, a computer readable storage medium may include non-transitory and tangible storage media or memory media such as magnetic or optical media, e.g., disk or DVD/CD coupled to a computer system or gateway device. A computer readable storage medium may also include any volatile or non-volatile media such as RAM (e.g. SDRAM, DDR SDRAM, RDRAM, SRAM, etc.), ROM, etc., that may be included in some embodiments of the computer systems described above as system memory, gateway device, or another type of memory. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of the inventions disclosed herein.

What is claimed is:

1. A system comprising:
   at least one processor;
   a memory having stored thereon computer readable instructions that, upon execution by the at least one processor, cause the system to at least:
   receive a route tracing request packet comprising a time-to-live value and a first source address of a source of the route tracing request packet;
   examine the route tracing request packet for a time-to-live value indicating that the route tracing request packet has expired and sending a time-to-live exceeded message to the first source address, the time-to-live exceeded message comprising a second source address that resolves to a domain name indicative of the time-to-live exceeded message being associated with a reverse route trace; and
   examine the route tracing request packet for a time-to-live value indicating that the route tracing request packet is unexpired, and sending a second route tracing request packet enabling tracing of at least a portion of a return path to the first source address, the second route tracing request packet addressed to the first source address and comprising a time-to-live value decreased with respect to the time-to-live value of the route tracing request packet.

2. The system of claim 1, wherein the route tracing request packet indicative of a request to perform a network trace is associated with a control message protocol.

3. The system of claim 1, wherein the route tracing request packet is addressed to a network address of a data center.

4. The system of claim 1, wherein the route tracing request packet is addressed to a network address of the system.

5. The system of claim 1, wherein the second source address is a predefined network address.

6. A method, comprising:
    receiving a route tracing request packet comprising a time-to-live value and a first source address;
    sending, based on the time-to-live value indicating that the route tracing request packet has expired, a time-to-live exceeded message to the first source address, the time-to-live exceeded message comprising a second source address that resolves to a domain name indicative of a reverse network trace; and
    sending, based on the time-to-live value indicating that the route tracing request packet is unexpired, a second route tracing request packet addressed to the first source address, the second route tracing request packet based on the route tracing request packet and comprising a time-to-live value decreased with respect to the time-to-live value of the route tracing request packet, wherein expiry of the second route tracing request packet provides information indicative of at least a portion of a return path to the first source address.

7. The method of claim 6, wherein the route tracing request packet is associated with a control message protocol.

8. The method of claim 6, further comprising:
    receiving packets addressed to a network address of a data center.

9. The method of claim 6, further comprising:
    forwarding, to the first source address, time-to-live expired messages received in response to sending the second route tracing request packet.

10. The method of claim 6, further comprising:
    setting the source address of the message to a predefined network address that resolves to a domain name indicative of the reverse network trace.

11. The method of claim 6, wherein the message is indicative of a return path.

12. The method of claim 11, wherein a computing device at the first source address receives a plurality of messages, each of the plurality of messages indicative of a step in the return path.

13. The method of claim 6, wherein the decreased time-to-live value of the time-to-live exceeded message is based on decrementing the time-to-live value of the time-to-live exceeded message.

14. A method, comprising:
    determining that a first packet is associated with a route tracing request;
    generating a time-to-live exceeded message addressed to a source of the route tracing request, based on determining that the first packet has a time-to-live value indicating that the first packet has expired, wherein the time-to-live exceeded message comprises a source address that resolves to a domain name indicative of a reverse route trace;
    sending the time-to-live exceeded message;
    determining that a second packet is associated with the route tracing request; and
    forwarding a modified second packet, based on determining that the second packet has a time-to-live value indicating that the first packet is unexpired, the modified second packet addressed to the source of the route tracing request and comprising a decreased time-to-live value.

15. The method of claim 14, wherein the first and second packets are associated with a control message protocol.

16. The method of claim 14, wherein the first and second packets are addressed to a network address of a data center.

17. The method of claim 14, further comprising:
    setting the source address of the time-to-live exceeded message to a predefined network address.

18. The method of claim 14, wherein the time-to-live exceeded messages identifies a portion of a return path.

19. The method of claim 14, wherein a computing device at the source of the route tracing request receives a plurality of messages, each of the plurality of messages indicative of a step in a return path.

20. The method of claim 14, further comprising:
    receiving a second time-to-live expired message in response to sending the second packet; and
    forward a modified second time-to-live expired message to the source of the route tracing request.

* * * * *